United States Patent
Ino et al.

(10) Patent No.: US 8,629,958 B2
(45) Date of Patent: Jan. 14, 2014

(54) LIQUID CRYSTAL DISPLAY DEVICE

(75) Inventors: Masumitsu Ino, Kanagawa (JP); Tsutomu Tanaka, Kanagawa (JP); Yoko Fukunaga, Kanagawa (JP); Hidemasa Yamaguchi, Kanagawa (JP); Shinji Nakamura, Kanagawa (JP)

(73) Assignee: Japan Display West, Inc., Chita (JP)

( * ) Notice: Subject to any disclaimer, the term of this patent is extended or adjusted under 35 U.S.C. 154(b) by 0 days.

(21) Appl. No.: 10/474,482

(22) PCT Filed: Feb. 14, 2003

(86) PCT No.: PCT/JP03/01539
§ 371 (c)(1), (2), (4) Date: Mar. 15, 2004

(87) PCT Pub. No.: WO03/069399
PCT Pub. Date: Aug. 21, 2003

(65) Prior Publication Data
US 2004/0156604 A1   Aug. 12, 2004

(30) Foreign Application Priority Data
Feb. 14, 2002  (JP) ................. 2002-036416

(51) Int. Cl.
*G02F 1/1335* (2006.01)
(52) U.S. Cl.
USPC .......................... 349/114; 349/113
(58) Field of Classification Search
USPC ............ 349/113, 114, 43, 46, 47, 37
See application file for complete search history.

(56) References Cited

U.S. PATENT DOCUMENTS

| | | | | |
|---|---|---|---|---|
| 4,818,981 A | * | 4/1989 | Oki et al. | 345/92 |
| 5,116,789 A | * | 5/1992 | Dumbaugh et al. | 501/66 |
| 5,659,379 A | * | 8/1997 | Morimoto | 349/149 |
| 5,764,322 A | * | 6/1998 | Mamiya et al. | 349/65 |
| 5,920,367 A | * | 7/1999 | Kajimoto et al. | 349/162 |
| 6,049,410 A | * | 4/2000 | Nakagaki et al. | 359/253 |
| 6,281,952 B1 | * | 8/2001 | Okamoto et al. | 349/12 |
| 6,556,258 B1 | * | 4/2003 | Yoshida et al. | 349/61 |
| 6,700,636 B2 | * | 3/2004 | Kim et al. | 349/139 |
| 2001/0020989 A1 | * | 9/2001 | Nakayama | 349/61 |
| 2001/0020991 A1 | * | 9/2001 | Kubo et al. | 349/113 |
| 2002/0018039 A1 | * | 2/2002 | Morita | 345/100 |

FOREIGN PATENT DOCUMENTS

| | | |
|---|---|---|
| EP | 0 973 058 A1 | 1/2000 |
| JP | 08-286178 | 11/1996 |
| JP | 10-142627 | 5/1998 |
| JP | 11-242226 A | 9/1999 |
| JP | 11-305248 A | 11/1999 |

(Continued)

*Primary Examiner* — Lucy Chien
(74) *Attorney, Agent, or Firm* — Robert J. Depke; The Chicago Technology Law Group, LLC

(57) ABSTRACT

A liquid crystal display device capable of dealing with highly definition display and securing both of transmission type display luminance and reflection type display luminance, wherein the Cs on-gate structure is adopted, and a light reflectance is set to be in a range of 1% or more and 30% or less and a light transmittance is set to be in a range of 4% or more and 10% or less on the display panel formed by arranging in matrix a plurality of pixel regions 4 having a reflection region A for reflection type display by reflection of an ambient light and a transmission region B for transmission type display by transmission of light from a light source provided inside.

5 Claims, 20 Drawing Sheets

(56) References Cited

FOREIGN PATENT DOCUMENTS

| JP | 2000-011902 | | 1/2000 |
|---|---|---|---|
| JP | 2000-019563 | A | 1/2000 |
| JP | 2000-235180 | A | 8/2000 |
| JP | 2000-298267 | | 10/2000 |
| JP | 2001-134245 | A | 5/2001 |
| JP | 2001-154181 | | 6/2001 |
| JP | 2001-159876 | A | 6/2001 |
| JP | 2001-290148 | A | 10/2001 |
| WO | WO 01/08128 | A1 | 2/2001 |

* cited by examiner

1 DISPLAY PANEL

9 TFT

FIG. 11

| PNLN | RFL(%) |
|---|---|
| 1 | 42 |
| 2 | 39 |
| 3 | 36 |
| 4 | 49 |
| 5 | 47 |
| 6 | 46 |
| 7 | 43 |
| 8 | 36 |
| 9 | 46 |
| 10 | 45 |
| 11 | 42 |
| 12 | 38 |
| 13 | 40 |

AVERAGE REFLECTANCE : 42.23%

40 TFT

LIQUID CRYSTAL DISPLAY DEVICE

This application claims priority to Japanese Patent Application Number JP2002-036416, filed Feb. 14, 2002, which is incorporated herein by reference.

1. Technical Field

The present invention relates to a liquid crystal display device, particularly relates to a liquid crystal display device using both of a reflection type display and a transmission type display.

2. Background Art

By utilizing the characteristics of having a thin shape and a lower power consumption, liquid crystal display devices are used as display devices of a wide range of electronic apparatuses. There are electronic apparatuses using a liquid crystal display device of, for example, notebook type personal computers, displays for car navigation, personal digital assistants (PDAs), mobile phones, digital cameras and video cameras, etc. When roughly dividing these liquid crystal display devices, there are known transmission type liquid crystal display devices for displaying by controlling the passage and blocking of light from an internal light source referred to as a backlight on a liquid crystal panel and reflection type display devices for displaying by reflecting sunlight or other external light by a reflection plate, etc. to control the passage and blocking of the reflected light by the liquid crystal panel.

In the transmission type liquid crystal display devices, 50% or more of the total power consumption is taken by the backlight and it is difficult to reduce the power consumption. Also, the transmission type display devices have a disadvantage that the display looks dark when an ambient light is bright and the viewability is lowered. On the other hand, in the reflection type liquid crystal display devices, there is no problem of an increase of a power consumption since a backlight is not provided, but there is a disadvantage that the viewability is extremely lowered when an ambient light is low.

In order to solve the disadvantages of both of the transmission type and reflection type display device as above, a liquid crystal display device using both of reflection and transmission type, wherein both of transmission type display and reflection type display are realized in one liquid crystal panel, has been proposed. The liquid crystal display device using both of reflection and transmittance displays by reflecting an ambient light when the surroundings are bright, while displays by using a light of a backlight when surroundings are dark.

In a conventional dual reflection and transmission type liquid crystal display device, however, while it was supposed that both of the transmission type display and the reflection type display were provided together, there have been disadvantages that the luminance was insufficient and the viewability was low when comparing with a normal reflection type and a normal transmission type liquid crystal display devices. Particularly, a conventional dual reflection and transmission type liquid crystal display device had the liquid crystal panel configuration giving priority to reflection displaying, so that a wide area of a region reflecting the ambient light was secured and transmission luminance was sacrificed in order to secure a reflectance.

For example, in the Patent Gazette No. 2955277 (patent document 1), a liquid crystal display device using both of reflection type display and transmittance type display is disclosed. The liquid crystal display device presumes a reflection type liquid crystal display device using a reflection light of the ambient light and dealing with the fact that the viewability is extremely lowered when the ambient light is low.

However, since the dual reflection and transmission type liquid crystal display device giving priority to the reflection type appeals a little to the subjectivity of human, a liquid crystal display device wherein the transmittance type displaying is the main display means, such as PDAs, mobile phones, notebook type personal computers, display device for car navigation, digital cameras and video cameras, is widely used on the real market.

Also, in the patent document 1, only the color reproducibility is a point to improve and necessary luminance for the liquid crystal display device is not described.

Also, in the Japanese Unexamined Patent Publication No. 2000-111902 (patent document 2), a liquid crystal display device using both of reflection type display and transmittance type display is disclosed. In the liquid crystal display device, windows of a color filter for improving the luminance of a reflection portion are arranged allover the reflection portion region. In the liquid crystal display device according to the patent document 2, a shape of the windows is not described, but when the reflection region is formed on a limited region, directional characteristics of a reflection light to an incident light is liable to arise. Also, since the minimum size of the window is not regulated, the reflection region cannot be minimized when the transmission type displaying is the main display means.

In a liquid crystal display device, it is desired to improve viewability of display when used indoors and used outdoors. Therefore, in the dual reflection and transmission type liquid crystal display device, it is desired to improve viewability in the both cases of being used as a reflection type and used as a transmission type. Particularly, as explained above, electronic apparatuses adopting the transmission type display as the main display means rather than the reflection type display are used much in reality, so that it is desired to improve luminance in the transmission type display in the dual reflection and transmission liquid crystal display device.

On the other hand, along with demands of improving luminance of the transmission type display, it is required to pursue a finer liquid crystal display device.

For example, a liquid crystal display device used in the above PDAs, mobile phones, notebook type personal computers, display device for car navigation, digital cameras and video cameras was produced conventionally between 100 ppi (pixel per inch) and 140 ppi. However, in order to prevent aliasing of displayed letters and to attain displaying by the same image quality as in a picture image, needs for definition of 200 ppi or more have increased.

Concerning an increase in definition to 200 ppi, there has been disadvantages of a decrease of a region able to be used for transmission type display and a decrease of luminance in transmission type display in each pixel, such that minimum widths or pitch of signal lines and gate lines are 5 μm or more due to restrictions of designing a liquid crystal pixel.

For example, by increasing backlight luminance used in the transmission type, the above high definition can be realized while securing high luminance of transmission type display. However, as explained above, by increasing luminance of the backlight, a power consumption of the liquid crystal display device increases, which becomes a disadvantage for the liquid crystal display device featuring a low power consumption.

DISCLOSURE OF THE INVENTION

An object of the present invention is to provide a liquid crystal display device capable of dealing with highly fine display and securing luminance in transmission type display of an equivalent level to that of a transmission type display device while securing luminance in a reflection type display required at minimum in the reflection type display.

A liquid crystal display device of a first aspect of the present invention is provided with a display panel including a plurality of pixel regions arranged in matrix on a substrate, a plurality of transistors formed for each pixel region and arranged in matrix, a plurality of gate lines for connecting gate electrodes of the plurality of transistors, a plurality of data signal lines for connecting first electrodes of the plurality of transistors, a storage capacitor wherein one electrode is connected to a second electrode of the transistor, a storage capacitor line for connecting the other electrode of the storage capacitor, and a liquid crystal layer arranged between one electrode of the pixel region connected to the second electrode of the transistor and the other electrode opposing to the electrode, wherein the storage capacitor is connected to a gate line of the former stage and has the Cs on-gate structure wherein a storage capacitor is superimposed on the gate line; a reflection region and transmission region are arranged in parallel on each of the pixel regions; and a reflectance of light on the display panel by the reflection region is 1% or more and 30% or less, and a transmittance of light on the display panel by the transmission region is 4% or more and 10% or less.

Preferably, light amount of the display light is 20 cd/m$^2$ or more and 2000 cd/m$^2$ or less under a condition that irradiation of light of a light source is 500 cd/m$^2$ or more and 25000 cd/m$^2$ or less on the display panel.

Also preferably, light amount of the display light is 20 cd/m$^2$ or more and 1000 cd/m$^2$ or less under a condition that irradiation of a light of an ambient light is 2000 lx or more and 50000 lx or less on the display panel.

Preferably, the transistor is a thin film transistor having a semiconductor layer of low temperature polycrystalline silicon.

Preferably, the reflection region is formed by a metal film having a high reflectance.

Preferably, an area of the transmission region is 40% or more of the entire pixel region and an area of the reflection region is 1% or more and 60% or less of the entire pixel region in the pixel region.

Also, an aperture ratio of the transmission region is 40% or more and less than 100% of the entire pixel region in the pixel region Also preferably, the reflection region is formed on a region immediately on a region of any one of interconnect region of the gate line, interconnect region of the data signal line, an interconnect region of the storage capacitor line, and a formation region of the transistor, or combination of some of them.

Also preferably, a polarity of a counter potential is inverted for every horizontal scanning period.

Also preferably, a selector switch for performing time-sharing driving on the signal lines is provided.

According to the above invention, the display panel is applied the Cs on-gate structure, wherein a transmission region is increased by appropriating a wiring region of auxiliary capacitor wirings (Cs wirings), etc., the reflectance of the light of the display panel wherein the pixel region is formed by reflection regions A for performing reflection type display by reflecting the ambient light taken from the outside and transmission regions B for performing transmission type display by transmission of a light from the light source provided inside arranged in a plurality of matrixes, the reflectance of the light of the display panel is set to be in a range of 1% or more and 30% or less, and the transmittance of the light is set to be in a range of 4% or more and 10% or less.

As a result, the luminance of transmission type display can be sufficiently secured, so that it is possible to deal with definition and set the transmittance low. Specifically, the transmittance is set to be 4% at minimum.

Also, due to an absorption effect of the respective layers composing the display panel, the transmittance becomes 10% or less.

Also, low temperature polycrystalline silicon is used, a size of a thin film transistor TFT per pixel is decreased, and the reflection region and the reflectance are improved. Furthermore, a reflection film is formed by a metal having a high reflectance or a flat reflection film is formed to further improve the reflection luminance.

BRIEF DESCRIPTION OF DRAWINGS

FIG. 11 is a view of measurement results of the reflectance when all surfaces of reflection electrodes of the display panel are a reflection film.

BEST MODE FOR CARRYING OUT THE INVENTION

Below, embodiments of a liquid crystal display device of the present invention will be explained with reference to the attached drawings.

Figure 1:
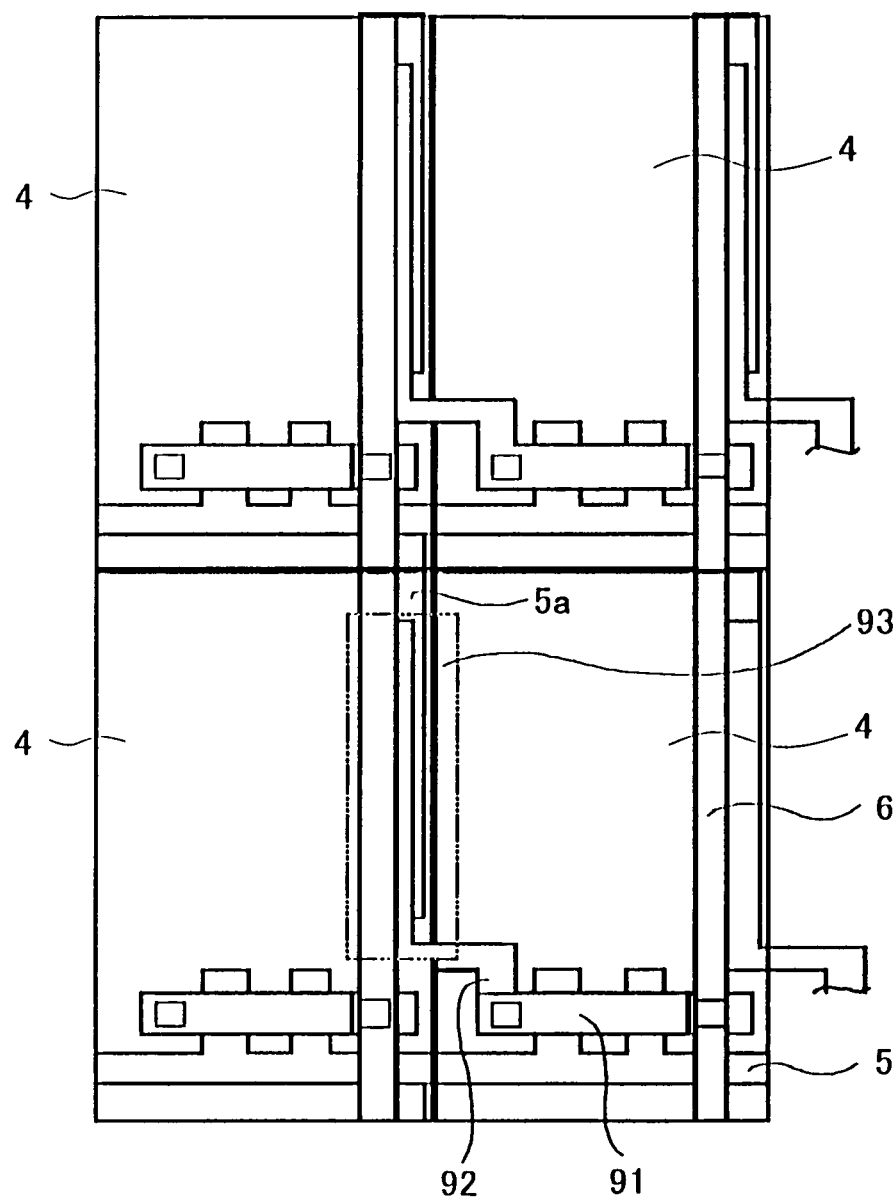
FIG. 1 is a partial plan view of the configuration of a display panel of a liquid crystal display device according to the present embodiment of the, present invention.
Figure 2:
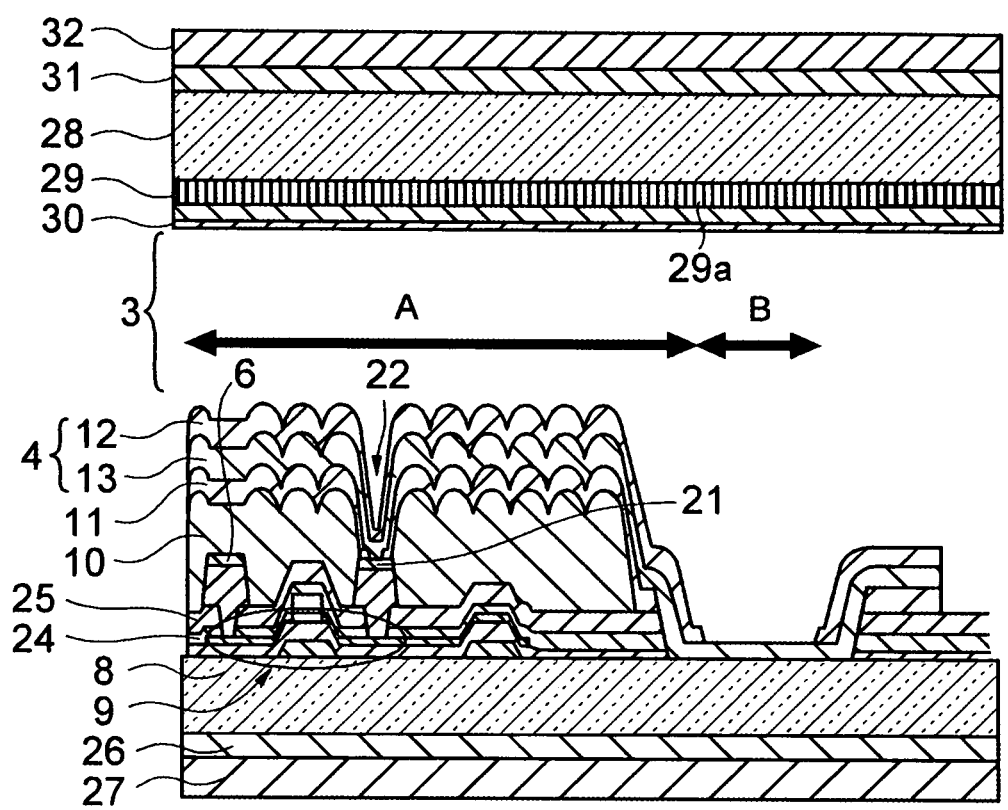
FIG. 2 is a sectional view of a pixel portion of the display panel of a liquid crystal display device according to the present embodiment of the present invention.

FIG. 1 is a plan view of a part of a pixel region of a display panel 1 in a liquid crystal display device of the present embodiment, and FIG. 2 shows the sectional configuration of a pixel portion in FIG. 1.

As shown in FIG. 2, the display panel 1 comprises a transparent insulating substrate 8, a thin film transistor (TFT) 9 formed thereon, and pixel regions 4, etc., and a transparent insulating substrate 28, an overcoat layer 29 formed thereon, a color filter 29a and a counter electrode 30 arranged to face the above first three, and a liquid crystal layer 3 sandwiched by the pixel region 4 and the counter electrode 30.

As shown in FIG. 1, the pixel portion is configured by the pixel regions 4 arranged in matrix, and gate lines 5 for supplying a scanning signal to the TFT 9 and signal lines 6 for supplying a display signal to the TFT 9 are provided to be orthogonal to each other around the pixel region 4.

Also, in a general liquid crystal display device, storage capacitor interconnects Cs are arranged independently and an auxiliary capacitor C is formed between the Cs lines and a connection electrode, however, in the liquid crystal display device of the present embodiment, a so-called Cs-on-gate structure is adopted wherein the Cs lines are not arranged independently, the gate line serves as the Cs lines, and the auxiliary capacitor is superimposed on the gate line.

In the liquid crystal display device having the Cs-on-gate structure, as shown in FIG. 1, by arranging a plurality of the gate lines 5 and a plurality of signal lines 6 to be orthogonal to each other, the pixel region 4 divided in matrix is provided, and TFT portions 91 to be formed a TFT is provided at crossing points of the gate lines 5 and the signal lines 6 for the respective pixel regions 4. The gate line 5 is provided with an extended portion 5a extending along the signal line 6 to the opposite side of the connection side with the TFT portions 91. Also, the pixel region 4 is provided with a connection electrode 92 connected to the TFT via the TFT portion 91 so as to face the extended portion 5a of the gate line 5 in the former stage.

In the liquid crystal display device configured as above, the extended portion 5a of the gate line 5 in the former stage is arranged so as to face the connection electrode 92 via an insulation film, a superposed portion of the extended portion 5a and the connection electrode 92 is used as an auxiliary capacitor region (hereinafter, referred to as a Cs region) 93 to be formed an auxiliary capacitor.

Also, as shown in FIG. 2, the pixel region 4 is provided with a reflection region A for reflection type display and the transmission region B for transmission type display.

The transparent insulating substrate 8 is formed, for example, by glass or other transparent material. On the transparent insulating substrate 8, a TFT 9 and a scattering layer 10 formed on the TFT 9 via an insulation film are formed, and on the scattering layer 10 is formed a flatting layer 11, a transparent electrode 13 and a reflection electrode 12 composing the pixel region 4 having the reflection region A and the transmission region B explained above.

Figure 3:
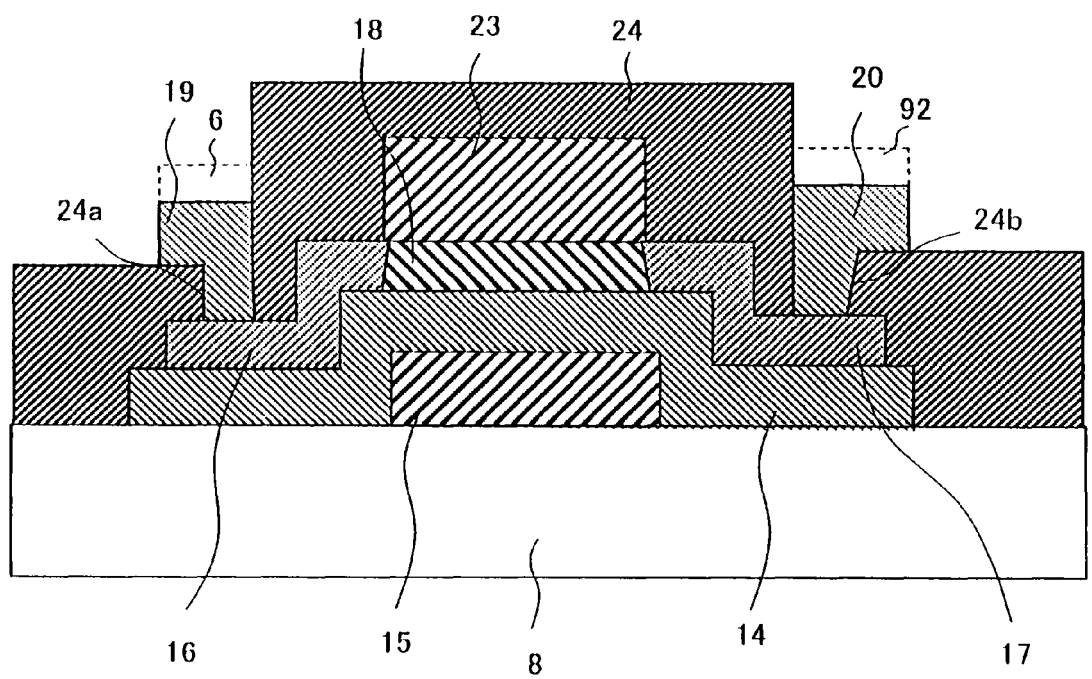
FIG. 3 is a sectional view of an example of the configuration of a thin film transistor in the liquid crystal display device according to the present embodiment of the present invention.

The TFT 9 is a switching element for selecting a pixel for displaying and supplying a display signal to a pixel region 4 of the pixel. As shown in FIG. 3, the TFT 9 has, for example, a so-called bottom gate structure, wherein a gate electrode 15 covered with a gate insulating film 14 is formed on the transparent insulating substrate 8. The gate electrode 15 is connected to the gate line 5, a scanning signal is input from the gate line 5, and the TFT 9 turns on and off in accordance with the scanning signal. The gate signal 15 is formed, for example, by forming a film of molybdenum (Mo), tantalum (Ta) or other metal or an alloy by a sputtering method, etc.

The TFT 9 is formed a pair of $n^+$ diffusion layers 16 and 17 and a semiconductor film 18 on the gate insulating film 14. One n+ diffusion layer 16 is connected to a source electrode 19 via a contact hole 24a formed on a first inter-layer insulating film 24, and the other n+ diffusion layer 17 is connected to a drain electrode 20 via a contact hole 24b formed on the first inter-layer insulating film 24 in the same way.

The source electrode 19 and the drain electrode 20 are obtained, for example, by performing patterning on aluminum (Al). The source electrode 19 is connected to a signal line 6 and receives as an input a data signal. The drain electrode 20 is connected to a connection electrode 21 (the connection electrode 92 in FIG. 1), furthermore, electrically connected to the pixel region 4 via a contact hole 22. As explained above, in the pixel region 4, the gate line 5 is provided with an extended portion 5a extending along the signal line 6 to the opposite side from the connection side with the TFT portion 91. The extended portion 5a serves as Cs lines. Also, the pixel region 4 is provided with the connection electrode 92 connected to the TFT 9 via the TFT portion 92 so as to face the extended portion 5a of the gate line 5 in the former stage.

The semiconductor thin film layer 18 is a low temperature polycrystalline silicon (poly-Si) thin film obtained, for example, by a CVD method and formed at a position corresponding to the gate electrode 15 via the gate insulating film 14.

A stopper 23 is formed immediately on the semiconductor thin film layer 18. The stopper 23 is to protect the semiconductor thin film layer 18 formed at a position corresponding to the gate electrode 19 from above.

Since the TFT 9 has more electron mobility in the case of forming the semiconductor thin film layer 18 by a low temperature polycrystalline silicon than in the case of forming the semiconductor thin film layer 18 by an amorphous silicon (a-Si), a size of an outer diameter can be made small.

Figure 4:
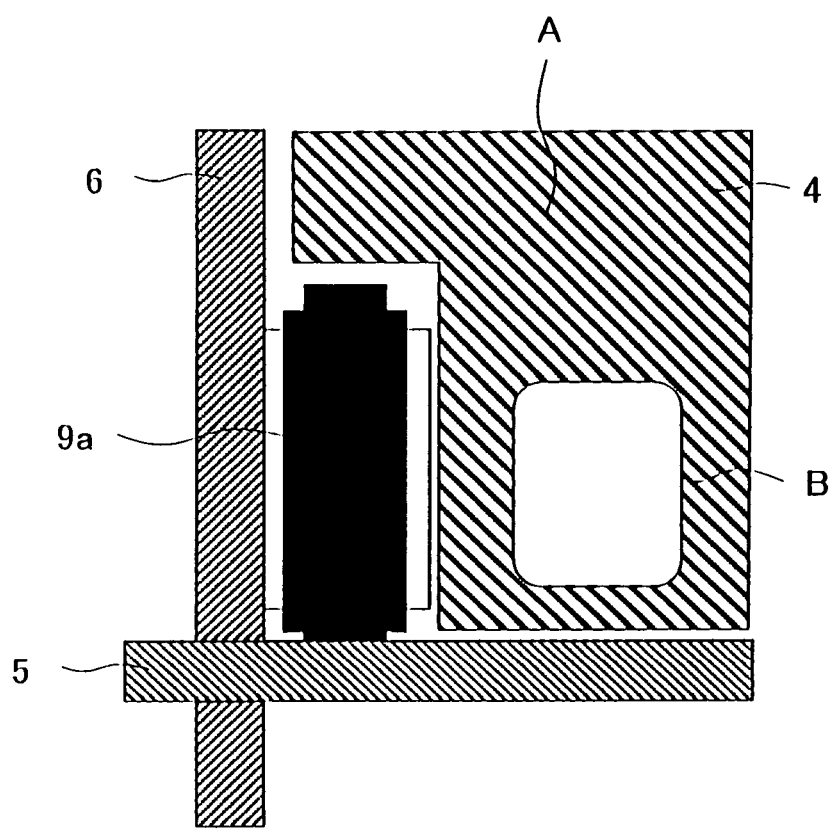
FIG. 4 is a plan view of an example of a pixel layout in the liquid crystal display device according to the present embodiment of the present invention.
Figure 5:
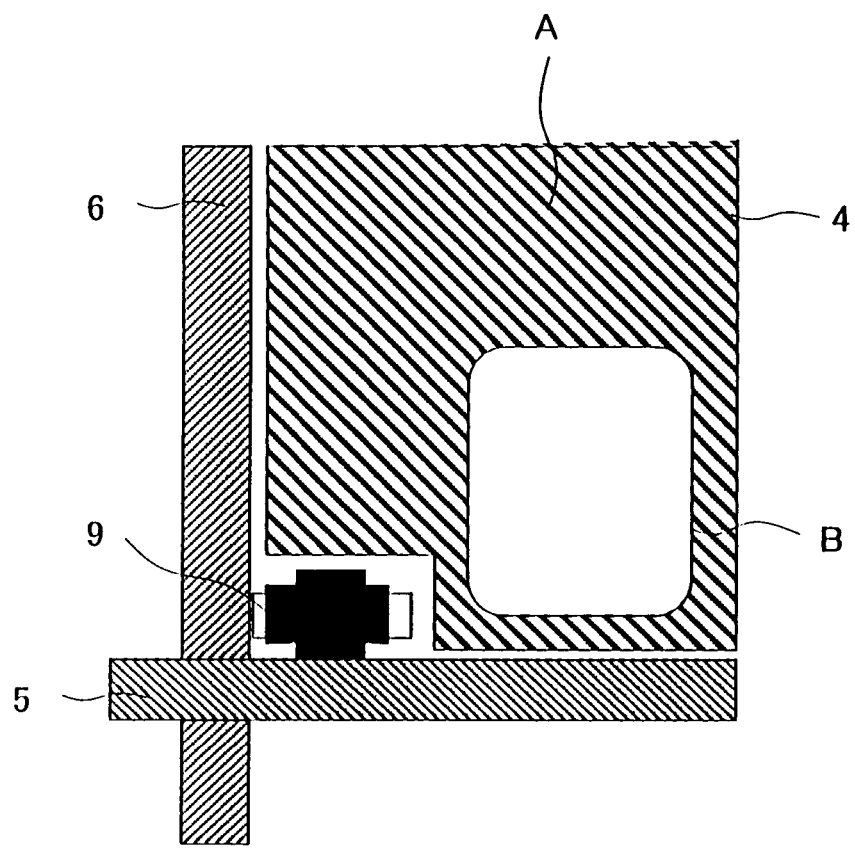
FIG. 5 is a plan view of another pixel layout in the liquid crystal display device according to the present embodiment of the present invention.

FIG. 4 and FIG. 5 are views schematically showing a size of the TFT wherein the semiconductor thin film layer 18 is formed by a-Si and low temperature poly-Si.

As shown in FIG. 4 and FIG. 5, in the liquid crystal display device using the TFT 9 wherein the semiconductor thin film layer 18 is formed by low temperature poly-Si, an area of the pixel region 4 composed of the reflection region A and the transmission region B can be made large, and even in the case where an area of the reflection region A is about the same as that of the conventional display device, the area of the transmission region B can be increased and the transmittance of the whole display panel can be improved.

Figure 6:
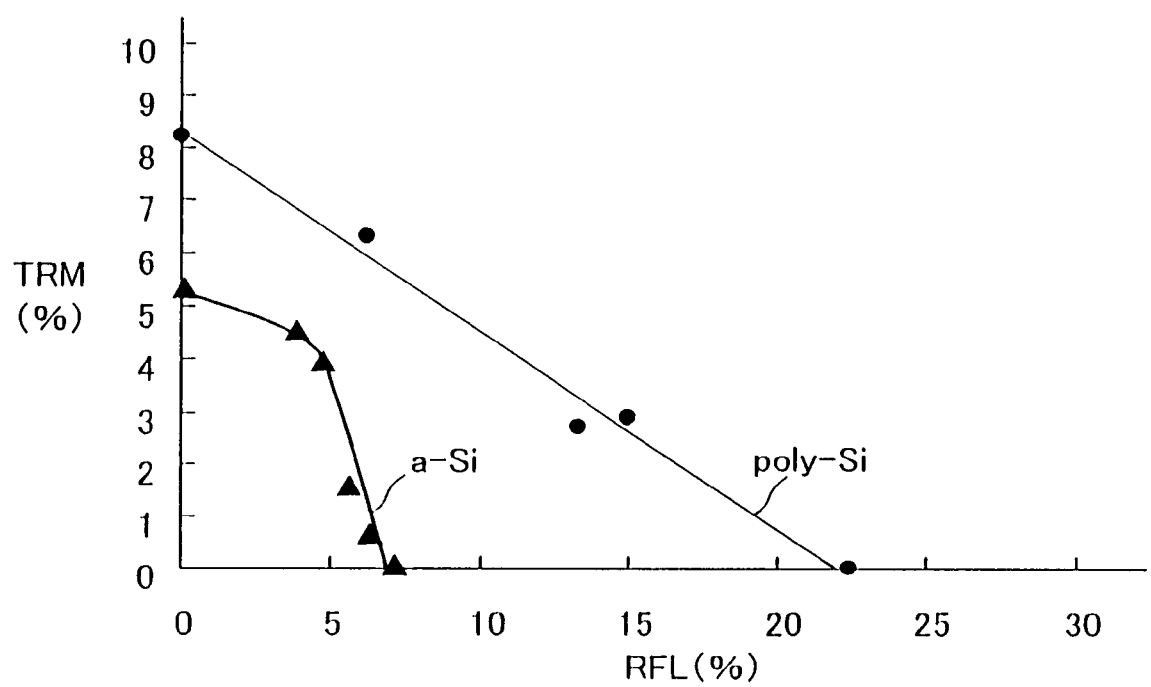
FIG. 6 is measurement data of the reflectance and transmittance of a liquid crystal display device using a TFT formed by Poly-Si and a liquid crystal display device using a TFT formed by a-Si.

FIG. 6 is a view showing a difference of the reflectance and the transmittance in a dual reflection and transmission type liquid crystal display device using the TFT wherein the semiconductor thin film layer 18 is formed by a-Si and low temperature poly-Si. In FIG. 6, an axis of abscissa indicates the reflectance RFL and an axis of ordinate indicates the transmittance TRM, respectively.

Measurement values of the reflectance and the transmittance shown in FIG. 6 are obtained by changing an area of an opening portion to be the transmittance region B in FIG. 4 and FIG. 5. In the above measurement, the pixel region 4 has a silver reflection film and a pixel size is 126 μm×42 μm.

As shown in FIG. 6, by applying low temperature poly-Si to the TFT 9, the reflectance of the liquid crystal display device reaches about 25% at maximum and the maximum of 8% of the transmittance is obtained. On the other hand, when using a-Si, the maximum reflectance is about 7% and the maximum transmittance is about 5%.

The scattering layer 10 and the flattening layer 11 are formed on the TFT 9 via the first and second inter-layer insulating films 24 and 25. The first inter-layer insulating film 24 is formed a pair of contact holes 24a and 24b in which a source electrode 19 and the drain electrode 20 are formed.

The reflection electrode 12 is made by a metal film, such as rhodium, titanium, chrome, silver, aluminum and chromel. The reflection region of the reflection electrode is formed with relief shapes and is configured to diffuse and reflect the external light. Due to this, the directivity of the reflection light is eased and the screen can be observed in a wide range of angles.

Particularly, when using silver (Ag), the reflectance in reflection type display becomes high and a reflection region A having a high reflectance can be obtained. Therefore, even if an area of the reflection region A is made small, the reflectance of a necessary level can be secured. A liquid crystal display device having a small reflection region will be called a "micro reflection liquid crystal display device".

Also, the transparent electrode 13 is made by a transparent conductive film, such as ITO.

The reflection electrode 12 and the transparent electrode 13 are electrically connected to the TFT 9 via the contact hole 22.

On the opposite surface of the transparent insulating substrate 8, that is, the surface of a side arranged with a not shown backlight as an inside light source, is provided with a ¼-wavelength plate 26 and a polarization plate 27.

A transparent insulating substrate 28 formed by using a transparent material, such as glass, is provided to face the transparent insulating substrate 8 and respective components formed thereon. On the surface of the liquid crystal layer 3 side of the transparent insulating substrate 28 is formed a color filter 29a and the overcoat layer 29 for flattening the surface of the color filter 29a, and a counter electrode 30 is formed on the surface of the overcoat layer 29. The color filter 29a is a resin layer colored to various colors by pigment or a dye and configured by combining filter layers of respective colors, for example, red, green and blue. The counter electrode 30 is made by a transparent conductive film, such as ITO.

On the surface of the opposite side of the transparent insulating substrate 28 is provided a ¼-wavelength plate 31 and the polarization plate 32.

The liquid crystal layer 3 sandwiched by the pixel region 4 and the counter electrode 30 is obtained by sealing a guest host liquid crystal mainly including nematic liquid crystal molecules having a negative dielectric anisotropy and containing a dichromatic dye in a predetermined ration. It is vertically oriented by a not shown orientation layer. In the liquid crystal layer 3, the guest-host liquid crystal is vertically oriented in a state where no voltage is applied and shifts to horizontal orientation in a state where a voltage is applied.

Figure 7:
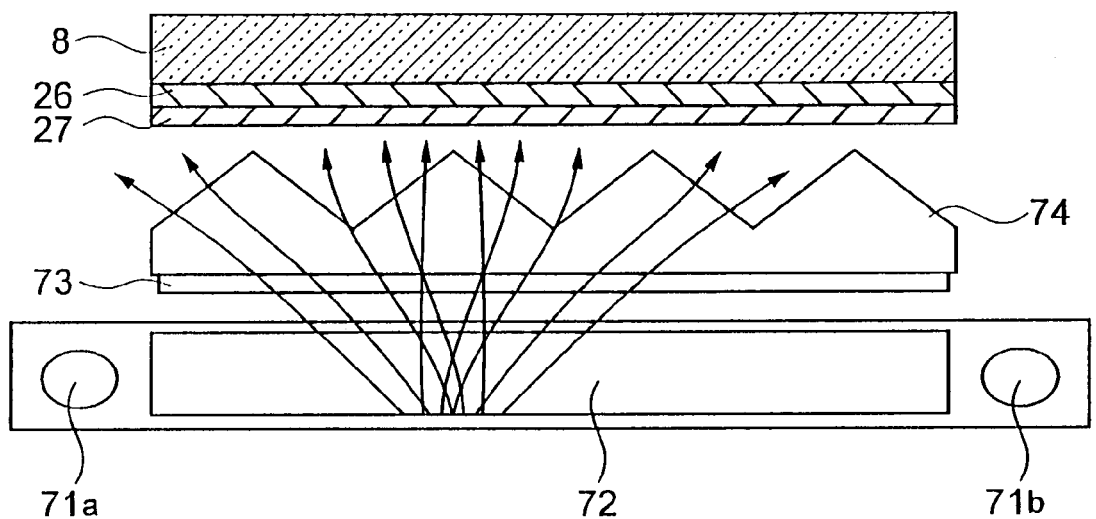
FIG. 7 is a view of a backlight and a condensing optical system thereof in the liquid crystal display device according to the embodiment of the present invention.

FIG. 7 is a backlight and a condensing optical system thereof in a liquid crystal display device according to the present embodiment.

In FIG. 7, reference numbers 71a and 71b indicate backlights, 72 indicates a light guide plate, 73 indicates a diffusion plate, and 74 indicates a lens sheet, respectively.

The backlights 71a and 71b are composed, for example, of a cathode fluorescent tubes. The light guide plate 72 guides lights of the backlights 71a and 71b to the display panel. The diffusion plate 73 is formed a relief surface. Due to this, the lights of the backlights 71a and 71b is uniformly irradiated to the display panel 1. The lens sheet 74 condenses the light diffused by the diffusion plate 73 to the center of the display panel 1. The light condensed by the lens sheet 74 passes through the transmission region B via the polarization plate 27, the ¼-wavelength plate 26, and the transparent substrate 8.

Figure 8:
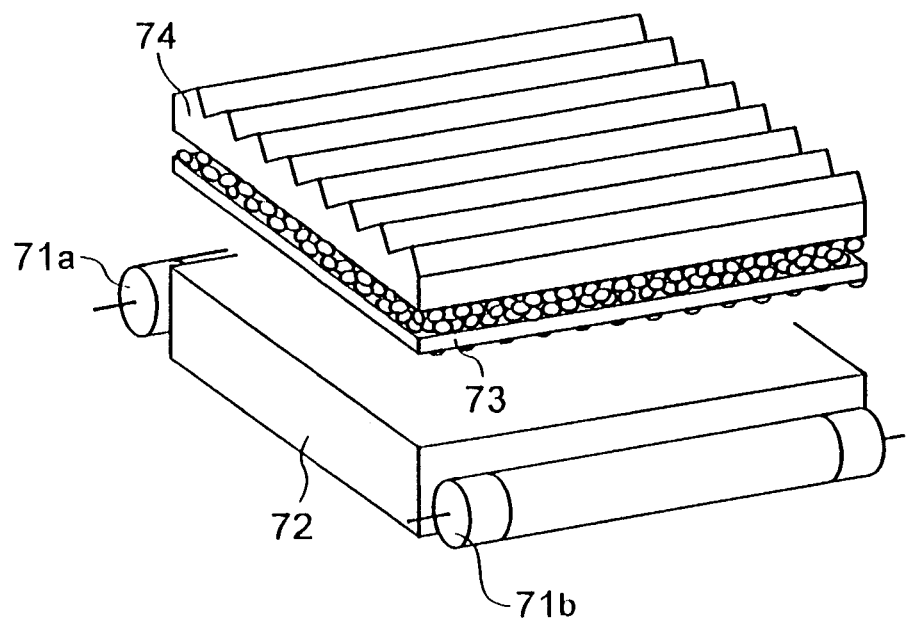
FIG. 8 is a perspective view of the backlight and a condensing optical system thereof shown in FIG. 7.

FIG. 8 is a perspective view of the backlight and the condensing optical system shown in FIG. 7.

Since the lens sheet 74 has a light condensing function, loss due to scattering of a light diffused by the diffusion plate 73 is suppressed, and the luminance of the illumination light is raised.

As explained above, conventionally, a liquid crystal display device has been prepared with a definition within a range from 100 ppi to 140 ppi. Since the definition is low, the aperture ratio of the transmission region B could be able to be relatively largely formed. Specifically, the aperture ratio of at least 50% was secured when designed for 140 ppi, so that the conventional transmittance becomes 5%.

Note that the transmittance in the liquid crystal display device is generally one-tenth of the aperture ratio of the transmission region B. The aperture ratio of the transmission region B is defined to be the ratio of the transmission region B with respect to the area of the entire pixel region 4.

The reason of setting the transmittance to be one-tenth of the aperture ratio of the transmission region B is to absorb and reflect the light from the backlight by the transparent insulating substrates 8 and 28, the first and second inter-layer insulating films 24 and 25 formed on the TFT 9, the deflecting plates 27 and 32 and the ¼-wavelength plates 26 and 31 composing the display panel 1.

Concerning an increase in definition to 200 ppi, for example, the pixel size becomes as small as 126 μm×42 μm, and due to restrictions the design of liquid crystal pixels, for example, the minimum width or pitch of the signal lines and gate lines are 5 μm or more, an area of the transmission region B becomes small. Specifically, the aperture ratio becomes 40% at the lowest.

The ratio of an area of the reflection region A with respect to an area of the entire pixel region 4, that is, the aperture ratio of the reflection region A becomes 60% or less when the pixel region 4 other than the transmission region B is occupied by the reflection region A, but the aperture ratio of the reflection region A cannot be reduced to 0%. From this, the aperture ratio of the reflection region A the least required for a dual both reflection and transmission type liquid crystal display device is made to be in a range of 1% or more and 60% or less.

In order to deal with the increase in definition while securing luminance of transmission type display, for example, luminance of the backlights 71*a* and 71*b* can be increased by 25%, but a power consumption of the liquid crystal display device is also increased.

Thus, by using the lens sheet 74 explained above, it becomes possible to deal with the increase in definition without increasing a power consumption of the backlights 71*a* and 71*b*. Specifically, luminance of the backlights 71*a* and 71*b* can be raised from the normal region of 400 cd/m$^2$ to 20000 cd/m$^2$ to a range of 500 cd/m$^2$ to 25000 cd/m$^2$ by the lens sheet 74.

Accordingly, in the present embodiment, the transmittance of a liquid crystal display device having micro reflection structure can be set to at least 4% to secure transmission luminance in the case of a liquid crystal display device having a high definition of 150 ppi or more.

On the other hand, in order to deal with increase in definition and not increase luminance of the backlights 71*a* and 71*b*, it is the optimal choice to set the transmittance to be at least 4%. Below, the reason for this will be explained.

To display by liquid crystal, surface luminance of the display panel 1 must be set within a certain range.

Figure 9:
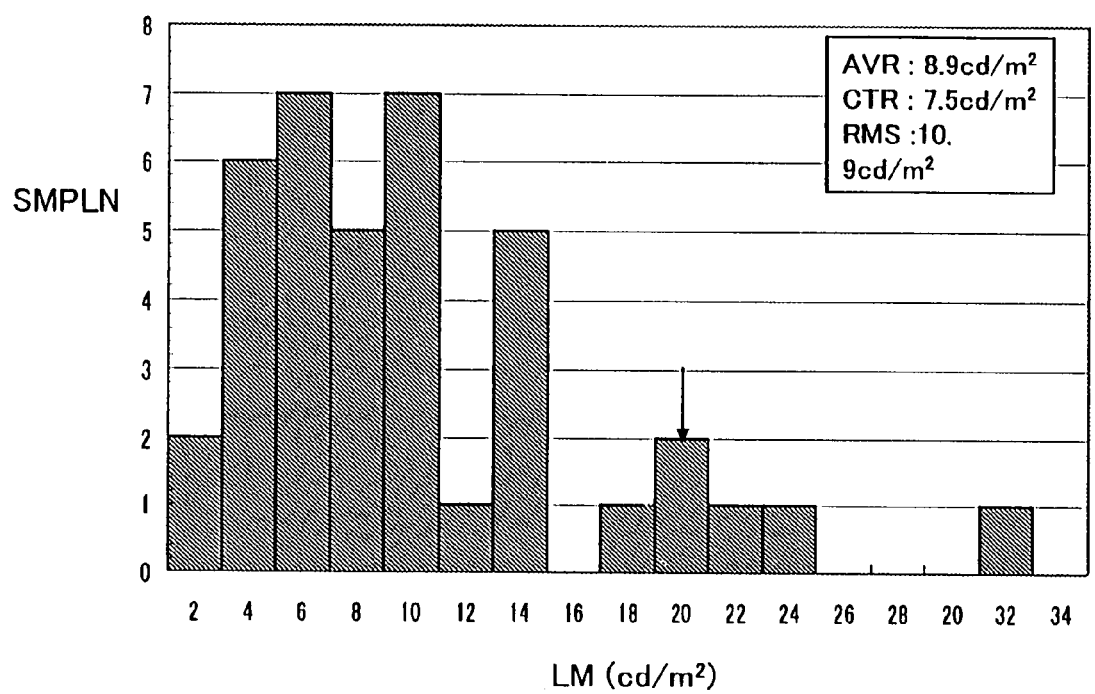
FIG. 9 is a view of investigation results of minimum display luminance required by a display panel in the liquid crystal display device according to the embodiment of the present invention.

FIG. 9 is a view of investigation results of minimum luminance required by the display panel surface, that is, a view of investigation results of the number of persons capable of recognizing displayed letters when the display luminance is changed to a range of 2 to 34 cd/m$^2$. In FIG. 9, an axis of abscissa indicates the luminance LM and an axis of ordinate indicates the number of samples SMPLN, respectively. Note that in this case, as shown in FIG. 9, an average value (AVR) is 8.9 cd/m$^2$, the center value (CTR) is 7.5 cd/m$^2$, and the RMS is 10.9 cd/m$^2$.

According to FIG. 9, 90% or more persons can recognize the displayed letters when the display luminance is 20 cd/m$^2$ or more. It is also known that human can recognize letters when 1000 cd/m$^2$ or less.

Accordingly, when displaying by a liquid crystal, the surface luminance of the display panel 1 must be maintained at 20 cd/m$^2$ or more and 1000 cd/m$^2$ or less.

Figure 10:
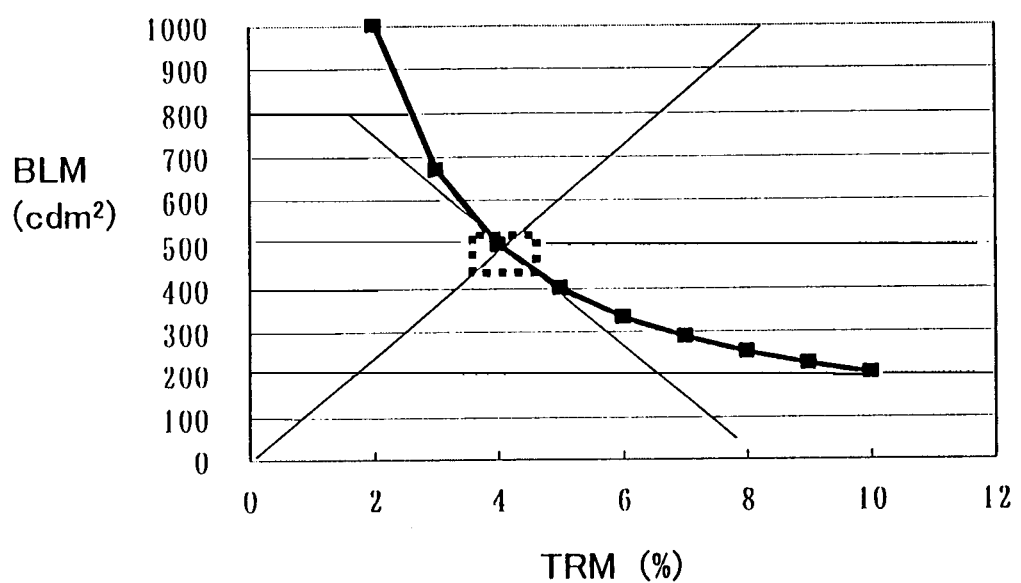
FIG. 10 is a graph showing a relationship of the transmittance and the backlight luminance when maintaining a constant luminance on a surface of the display panel in the liquid crystal display device according to the embodiment of the present invention.

When maintaining the surface luminance of the display panel 1 to be 20 cd/m$^2$, it means a product of the transmittance of the display panel 1 and the luminance of the backlight is 20 cd/m$^2$. Thus, a relationship of the transmittance and the luminance of the backlight can be expressed by an inversely proportional function as shown in FIG. 10. In FIG. 10, an axis of abscissa indicates the transmittance TRM and an axis of ordinate indicates the luminance BLM of the backlight, respectively.

In order to keep the transmittance and the luminance of the backlights to the minimum as much as possible, a position where a tangential normal of a curve as shown in FIG. 10 intersects an origin of the coordinate system becomes the most desirable condition. Here, the transmittance is 4%. Namely, 4% or more is a value of the optimum transmittance to deal with the increase in definition.

The reason why the transmittance becomes 10% at most is that the light from the backlight is absorbed and reflected by the transparent insulating substrates 8 and 28, the first and second inter-layer insulating films 24 and 25 formed on the TFT 9, the liquid crystal layer 3, the polarization plates 27 and 32 and the ¼-wavelength plates 26 and 31.

In the display panel 1, the polarization plates 27 and 32 are polarization plates of 50%, wherein the transmittance of each is 50%. A total of the transmittance of the remaining portion, that is, the transparent insulating substrates 8 and 28, the liquid crystal layer 3, the first and second inter-layer insulating films 24 and 25 formed on the TFT 9 and the ¼-wavelength plates 26 and 31, is deemed to be 40%. Even if considering that all pixels can be passed through, the maximum transmittance of the display panel 1 becomes 50% (polarization plate)×50% (polarization plate)×40% (glass+TFT) =10%.

Accordingly, in the present embodiment, a range of the transmittance becomes 4% or more and 10% or less.

As to the reflectance, it is known that the illuminance observed outdoors becomes 2000 cd/m$^2$ on very dark days (with overcost thunderclouds and snow) and becomes 50000 lx (cd/m$^2$) when fine. Also, in the same way that described above, the display luminance of 20 cd/m$^2$ or more is necessary for human to recognize displayed letters. Accordingly, the reflectance of the display panel becomes 1%. A measurement method and definition of the reflectance will be explained later on. The result coincides with the result of investigation on the lowest illuminance by emitting light to a PDA from the front surface in a dark room by the present inventors.

As to the maximum reflectance, for example, when covering the entire surface of the reflection electrode 12 with Ag, it is known from measurement that the reflectance of 42% is the limit. A table shown in FIG. 11 is measurement results of the reflectance when the entire surface of the reflection electrode 12 is made to be a reflection surface. In FIG. 11, PNLN indicates a display panel number and RFL indicates the reflectance, respectively. An average value of measurement data shown in FIG. 11 is 42.23%. Accordingly, the display panel according to the present embodiment has an average reflectance of 42% or so in the case where the entire surface of the reflection electrode 12 is made to be a reflection surface.

In actual, the transmittance is 4% or more, that is, the aperture ratio is 40% or more and less than 100%. Namely, the area ratio of the reflection region is 60% or less. This being so, the maximum reflectance of the display panel 1 becomes 60% (reflectance)×42% (total surface reflectance)=25%. The reason that the aperture ratio is less than 100% is as below. Namely, the transmission region is unavoidably blocked by the signal lines, gate lies and transistor portions inside pixels, so that the aperture ratio cannot be 100%, so that it is less than 100%.

Figure 12:
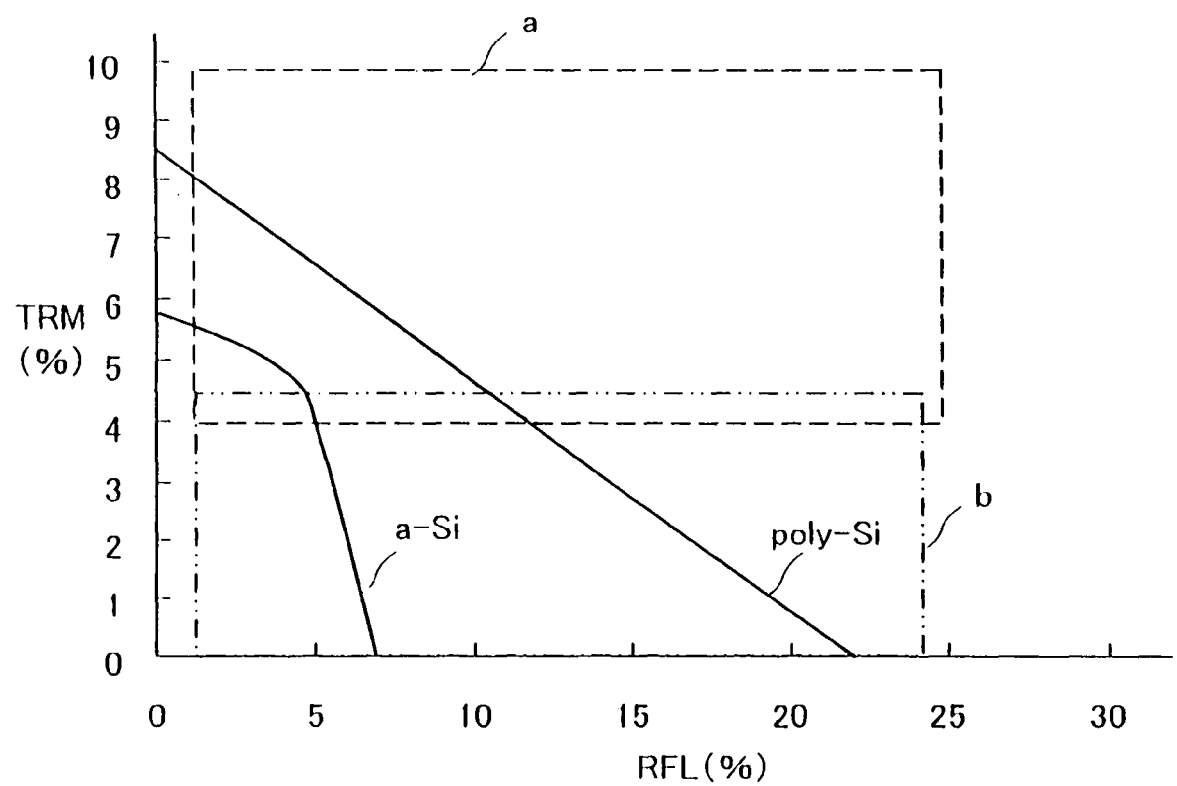
FIG. 12 is a view of settable ranges of the transmittance and the reflectance in the liquid crystal display device according to the embodiment of the present invention.

FIG. 12 is a view of a settable range of the transmittance and the reflectance in the liquid crystal display device according to the present embodiment. In FIG. 12, an axis of abscissa indicates the reflectance RFL and an axis of ordinate indicates the transmittance TRM, respectively. Also, in FIG. 12, the region indicated by the reference mark "a" indicates a settable range of the transmittance and the reflectance in the liquid crystal display device according to the present embodiment, and the region indicated by the reference mark "b" indicates a settable range of the transmittance and the reflectance in a conventional liquid crystal display device.

By the above liquid crystal display device of the present embodiment, the reflectance in the display panel 1 can be set in a range from 1% to 25% and transmittance can be set at 4% to 10%, that is, in the range of the region "a" shown in FIG. 12. Due to this, the liquid crystal display device of the present embodiment can secure a luminance of the display light equivalent to that of a liquid crystal display device only with transmission type display and secure characteristics of the reflection type even in the case of the luminance of the conventional backlight and high definition display of, for example, 200 ppi, so that display with high viewability can be realized even in the case where the sun light, illumination light, or other external light is dim.

On the other hand, in the conventional liquid crystal display device, the reflectance and the transmittance were set to be in the range of the region "b" shown in FIG. 12, so that the reflectance close to that of the present embodiment can be secured, however, the transmittance is low, the luminance of the display light in the transmission type display is insufficient, and viewability is lowered.

Next, the method of measurement of the reflectance of the above liquid crystal display device explained above will be explained.

Figure 13A:
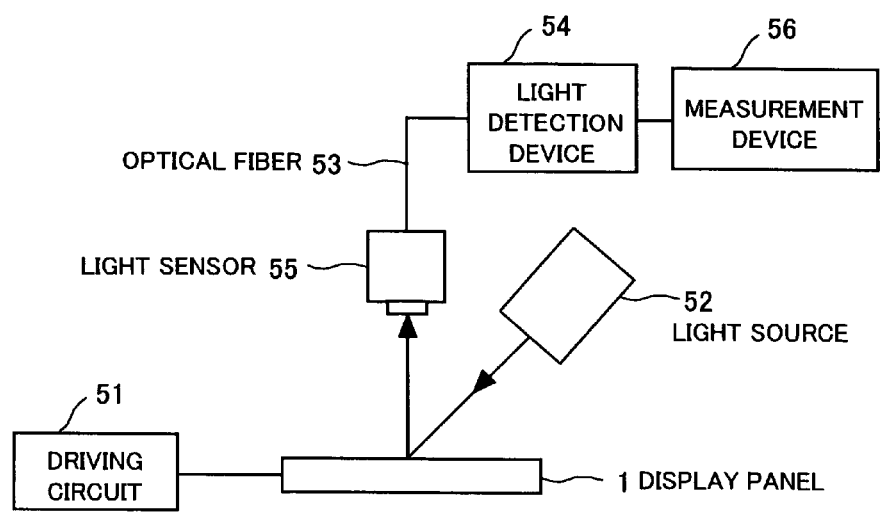
FIGS. 13A and 13B are views for explaining a method of measuring the reflectance.

As shown in FIG. 13A, light is emitted from an eternal light source 52 to the liquid crystal display panel 1 configured as above. The driving circuit 51 drives the display panel 1 by applying a suitable driving voltage to the display panel 1 so as to display white on the display panel 1. Then, the above incident light is reflected at the reflection film in the display panel 1, emitted and irradiated on the optical sensor 55. An optical fiber 53 transmits the light received by the optical sensor 55 to the light detection device 54 and the measurement device 56 via the optical fiber 53 and an output of the reflection light as white displaying is measured by the measurement device 56.

Figure 13B:
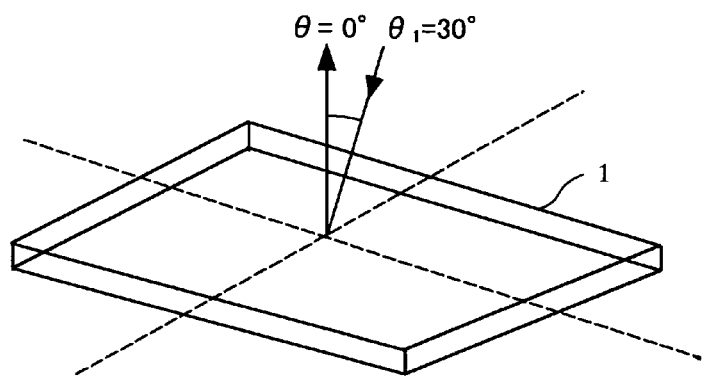

At this time, the light emitted from the eternal light source 52, as shown in FIG. 13B is emitted so that an incident angle $\theta_1$ becomes 30° at the center of the display panel 1 and so that the reflection light reflected on the display panel 1 is irradiated from the surface of the optical sensor 55, that is, the incident angle $\theta$ to the optical sensor 55 becomes 0°. By using the thus obtained output of the reflection light, the reflectance of the reflection region A is obtained as expressed by the formula 1 below.

$$R=R(\text{White})=(\text{output from white display/output from reflection standard})\times\text{reflectance of reflection standard} \quad (1)$$

Here, the reflection standard is a standard reflection object whose reflectance is already known. When the incident light is constant, the reflectance of measurement object can be estimated by comparing the amount of the reflection light from the measurement object with the amount of the reflection light from the reflection standard.

Figure 14:
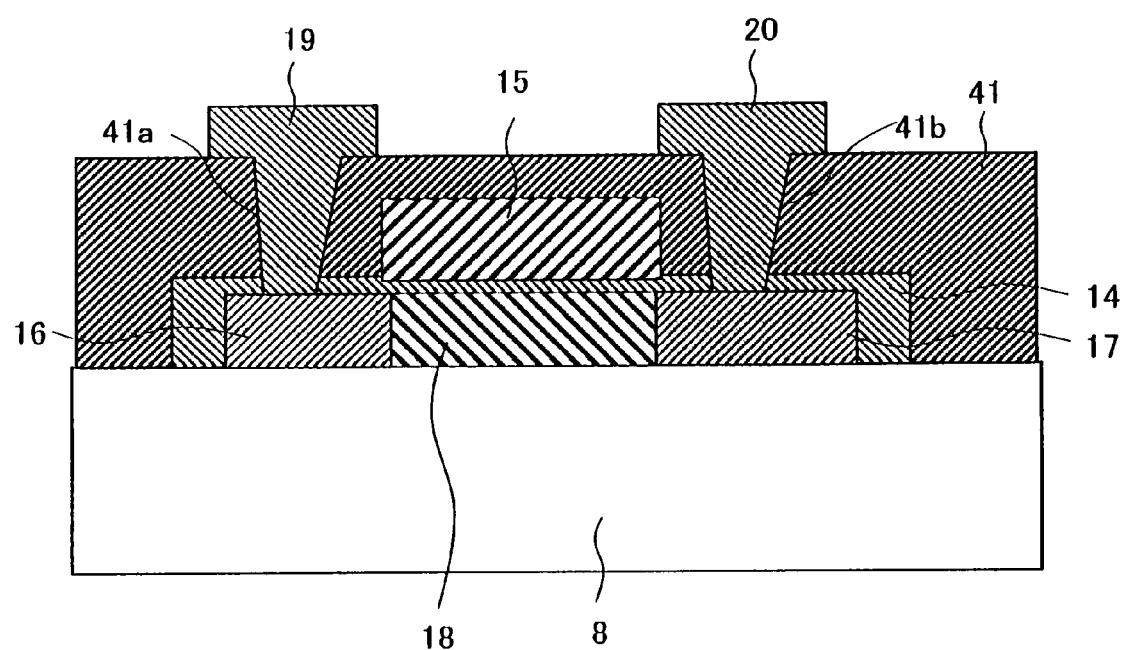
FIG. 14 is a sectional view of another example of the configuration of a thin film transistor in the liquid crystal display device according to the embodiment of the present invention.

Note that, while the above explanation was made assuming that the TFT 9 has the bottom-gate structure, the TFT 9 is not limited to the structure and may have a so-called top-gate structure shown in FIG. 14. In FIG. 14, the same reference numbers are used for the same components as those in the TFT 9 shown in FIG. 3 and explanations thereof will be omitted.

In a TFT 40, a pair of n⁺ diffusion layers 16 and 17 and the semiconductor thin film layer 18 are formed on the transparent insulating substrate 8. These are covered with a gate insulating film 14. On the gate insulating film 14, a gate electrode 15 is formed at a position corresponding to the semiconductor thin film layer 18 and covered with an inter-layer insulating film 41. On the inter-layer insulation film 41, a source electrode 19 and a drain electrode 20 are formed, the source electrode 19 is connected to one n⁺ diffusion layer 16 thorough a contact hole 41a formed on the inter-layer insulating film 41, and the drain electrode 20 is connected to the one n⁺ diffusion layer 16 through a contact hole 41b formed on the inter-layer insulation film 41.

According to the present embodiment, by condensing the light from the backlights by the lens sheet 74, the luminance of the backlights is improved, the transmittance is set to 4% or more and 10% or less, and the reflectance is set in a range from 1% to 25%, and while securing the display light luminance equivalent to that of a display device only with transmission type display and the reflection display light luminance necessary for display, it becomes possible to deal with reductions of a pixel size and a transmission region area along with increased definition of displaying without increasing the power consumption of the backlight.

Below, a driving method, etc. of the liquid crystal display device having the Cs-on-gate structure according to the present embodiment will be explained.

Figure 15:
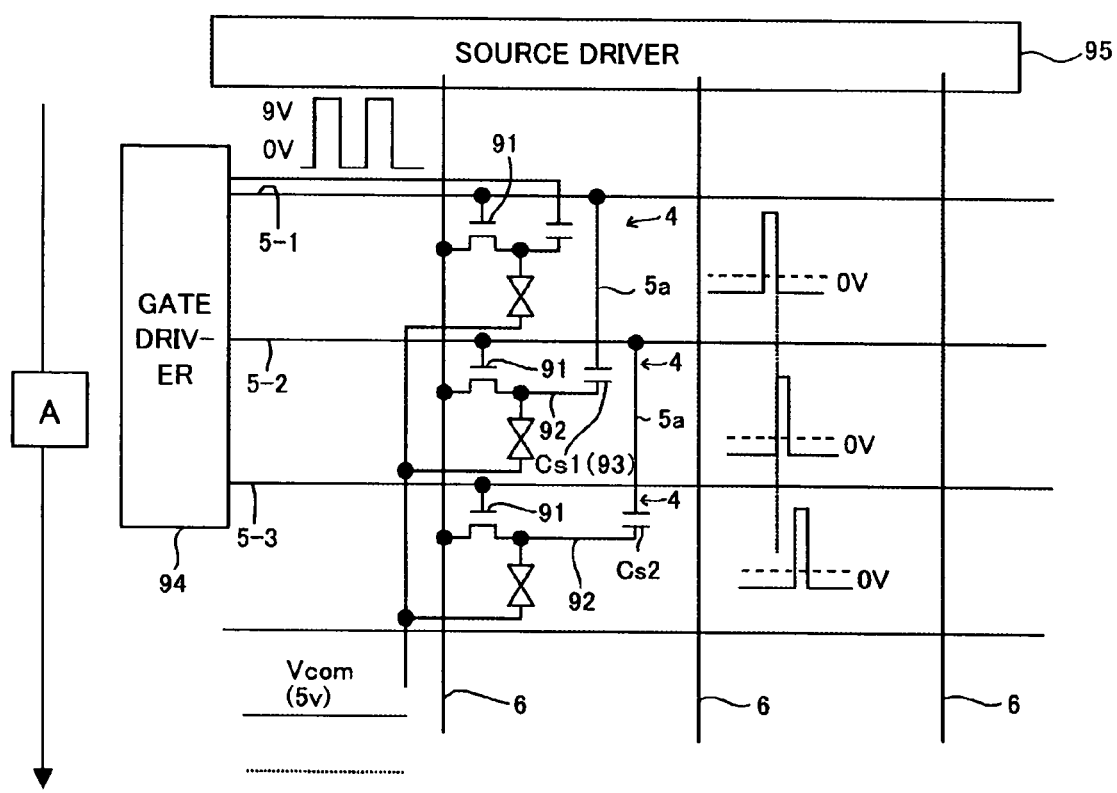
FIG. 15 is an equivalent circuit diagram of the liquid crystal display device having the Cs-on-gate structure according to the embodiment of the present invention.

FIG. 15 is an equivalent circuit diagram of a liquid crystal display device having the Cs on-gate structure according to the present embodiment.

In this liquid crystal display device, the gate lines 5 are driven by a gate driver 94 and the signal lines 6 are driven by a source driver 95.

In the case of the Cs-on-gate structure as shown in FIG. 15, since the gate line of the former stage is added the Cs capacity function, when the gate line of the own stage is turned on, the gate line of the former stage has to be turned off to suppress capacity changes. In the liquid crystal display device, a constant counter potential Vcom of, for example, 5V is applied and a gate waveform becomes the shape shown in the same figure.

In the above liquid crystal display device, a first gate line 5-1 is set ON, then the gate potential is fixed at OFF potential. Next, a second gate line 5-2 is set ON. At this time, since the first gate line 5-1 having the Cs line function has been set OFF, the held charge of the pixel is injected into the auxiliary capacitor Cs1 (Cs region 93) connected to the first gate line 5-1 via the source and drain of the TFT portion 91 and the pixel potential is decided. Then, the second gate line 5-2 is set OFF and a third gate line 5-3 is set ON, and the held charge is injected into the storage capacitor Cs2 connected to the second gate line 5-2 and the pixel potential is decided in the same way as in the above storage capacitor Cs1.

Note that, in the above driving method, the scanning direction is the direction of an arrow A in FIG. 10. Also, an OFF potential in this driving method is −3V, and the reason that the OFF potential is set to be this voltage is that a potential to completely cut a current is a minus potential in Nch used in the TFT portion 91. When the current cutting potential of the TFT portion 91 is on the plus side, it is needless to mention but the GND potential can be the OFF potential.

Figure 16:
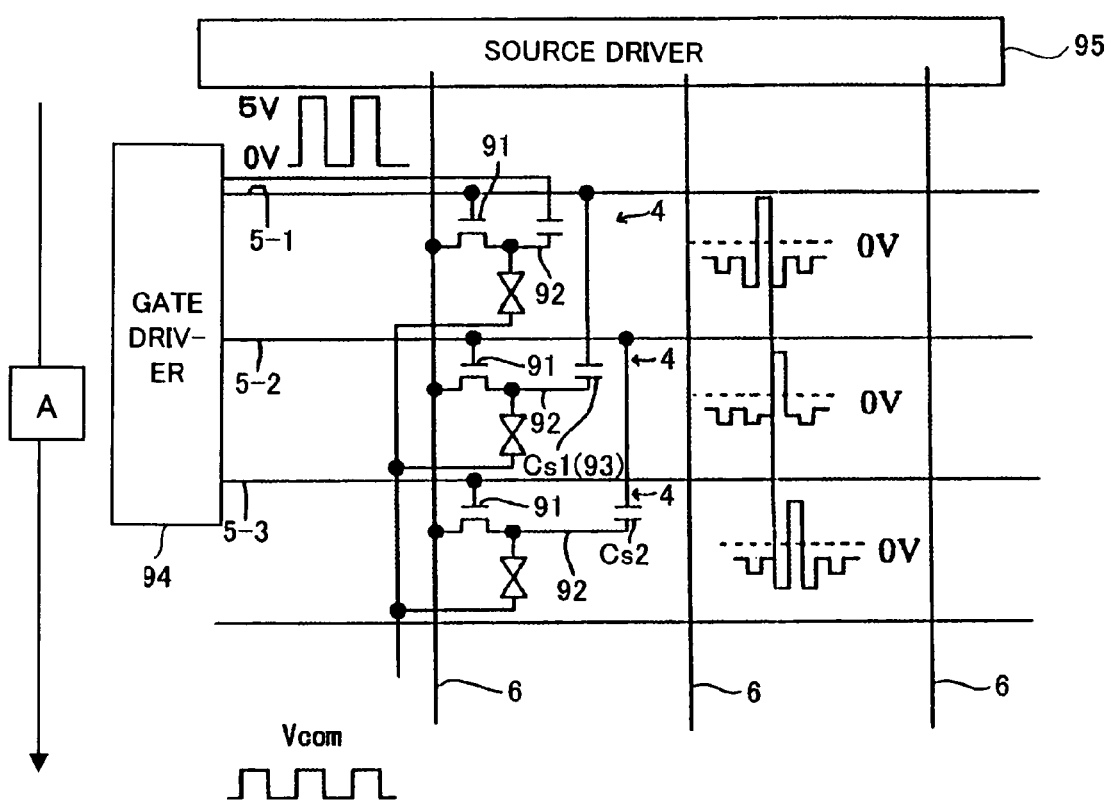
FIG. 16 is an equivalent circuit diagram of a liquid crystal display device applied with a different driving method from that in FIG. 15.

Also, FIG. 16 is an equivalent circuit diagram of a liquid crystal display device wherein a different driving method from that in FIG. 15 is adopted.

The circuit in FIG. 16 drives liquid crystal by a driving method of applying a counter potential Vcom so that the polarities are inverted for every horizontal scanning period (1H).

In this driving method, the liquid crystal is driven in the same way as in the above driving method, but it is different in a point that potential of Vss is the same potential as an amplitude voltage of a counter potential Vcom and fluctuates in synchronization with the counter potential Vcom when the first gate line 5-1 is set ON, and then OFF. The potential fluctuation of the Vss is an opposite potential of a polarity of a pixel signal in the same way as the counter potential Vcom. Also, in the liquid crystal display device shown in FIG. 16, a gate waveform becomes the waveform shown in the same figure.

According to this driving method, an amplitude of a signal potential can be made smaller than that in the above driving method, that is, a signal voltage applied to the signal line can be made low by inputting a potential having an opposite polarity of the pixel signal, so that the power consumption in the signal line can be reduced. Specifically, when applying a constant counter voltage Vcom shown in FIG. 5, 9V of signal potential was necessary as shown in the same figure, while when applying a counter potential Vcom wherein a polarity is inversed every 1H shown in FIG. 16, 5V of signal potential is sufficient as shown in the same figure.

Figure 17:
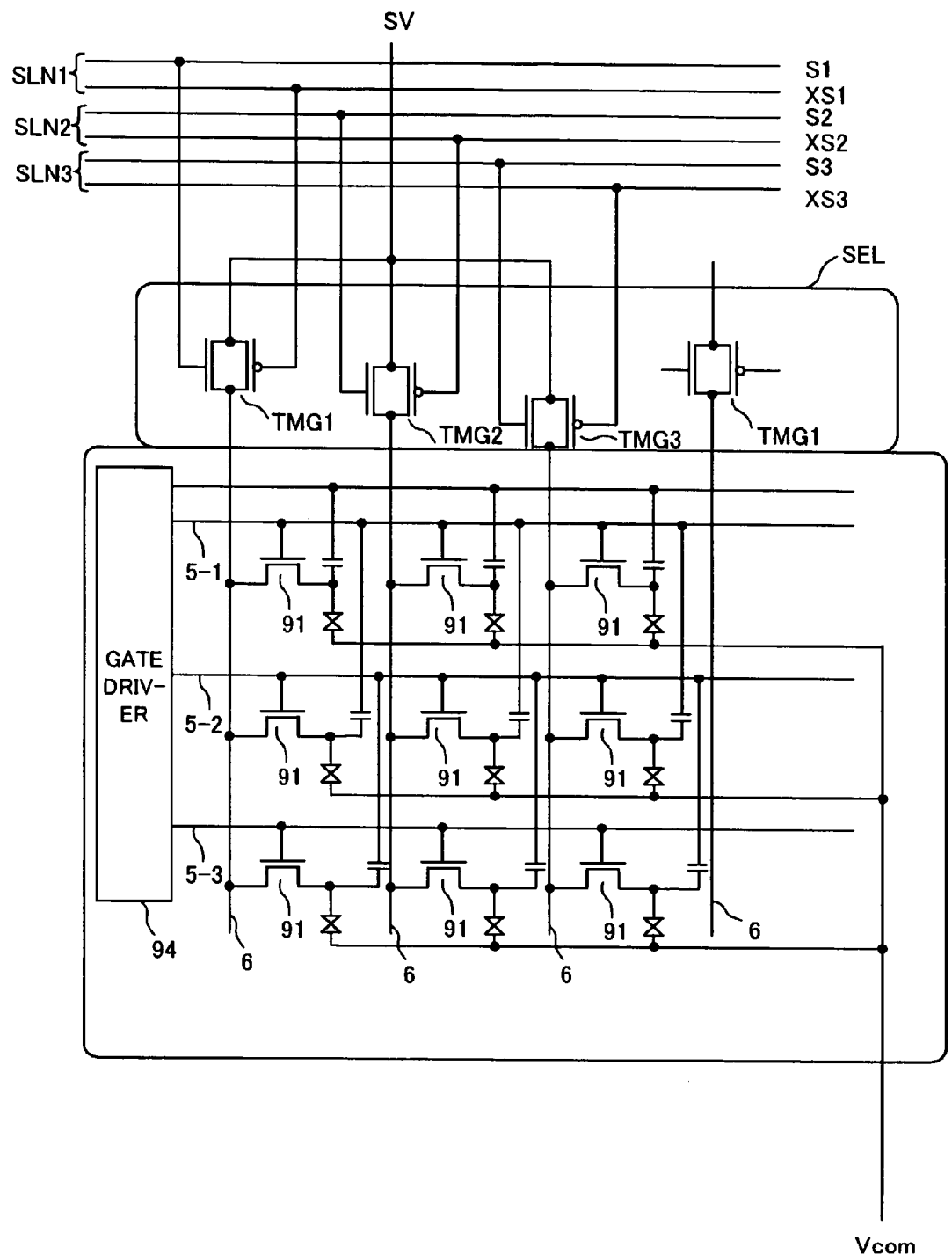
FIG. 17 is an equivalent circuit diagram of a liquid crystal display device having a panel circuit of low temperature polycrystalline silicon.

Also, FIG. 17 is an equivalent circuit diagram of a liquid crystal display device having a panel circuit of low temperature polycrystalline silicon. Note that, in FIG. 17, the same reference numbers are used for the same components as those in FIG. 15 and FIG. 16.

The circuit in FIG. 17 is different from the circuit shown in FIG. 15 and FIG. 16 and configured that the source driver is not mounted on the same panel. A signal SV from a not shown source driver is transferred to the signal lines 6 via a selector SEL having a. plurality of transfer gates TMG. Conducting conditions of the respective gates (analog switches) TGM are controlled by selection signals S1 and XS1, S2 and XS2, and S3 and XS3, . . .

More specifically, mutually adjacent plurality (for example, three) of signal lines 6 (6-1 to 6-3) are assumed to be one block, and three selector switches (analog switches) TMG (TMG 1 to TMG 3) are provided for giving time series signals to the respective signal lines in the one block, that is, for performing so-called time-sharing driving. Also, two selection signal lines SLN1 to SLM3 are provided in parallel with the gate lines (5-1 to 5-3) in each selector switch (analog switch) TGM. These selection signal lines SLN1 to SLN3 are given selection signals S1 to S3 and section signals XS1 to XS3 for successively turning on the three selector switches TMG1 to TMG3 from an external circuit (not shown). Note that the selection signals S1 to S3 and section signals XS1 to XS3 are inversion signals.

In a liquid crystal display device provided with the selector switch TMG, since signal lines 6 from the source driver can be reduced, even if a pad pitch becomes 60 μm due to restrictions of TAB (Tape Automated Bonding) packaging, the increase in definition of a density of three times as much as that, logically, the increase in definition of dots in the horizontal direction at 20 μm pitch can be attained.

FIGS. 18A, 18B, 19A and 19B are views of examples of forming the reflection region A immediately on the interconnects in the Cs-on-gate structure.

Figure 18A:
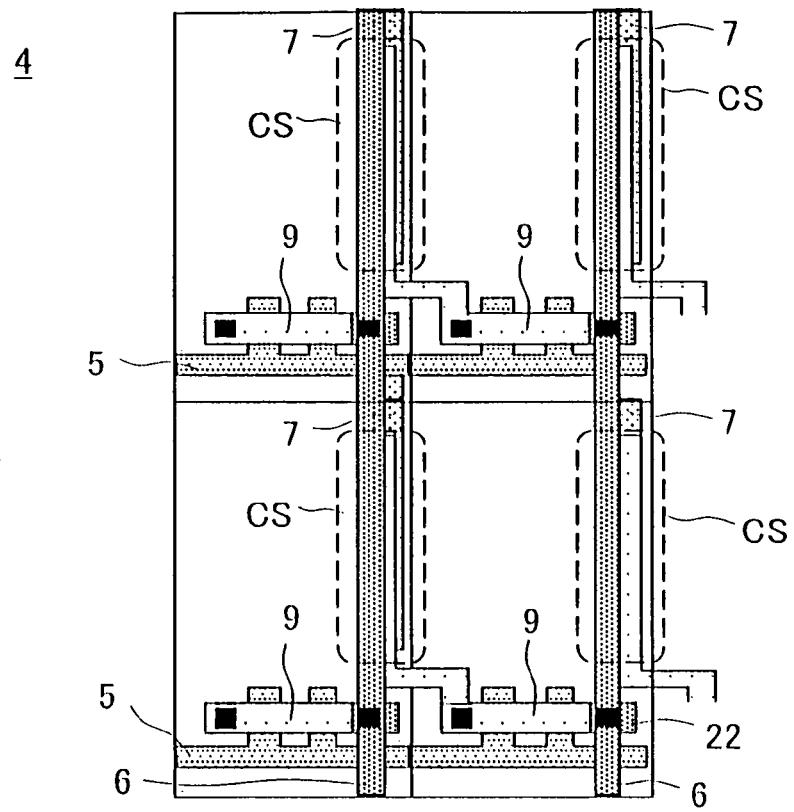
FIG. 18A is a second example of a pixel region layout in the liquid crystal display device according to the embodiment of the present invention and FIG. 18B is a view of an arrangement position of the reflection region in the pixel region.

FIG. 18A is a plan view of a 2×2 pixel region. In these pixel regions, a plurality of gate lines 5 and a plurality of signal lines 6 are arranged to be orthogonal to each other and divided in matrix. A TFT 9 is formed at an intersecting point of the gate line 5 and the signal line 6 for each pixel.

The gate line is provided with a CS line 7 along the signal line 6 on the opposite side of the connection side with the TFT 9. The CS line 7 is not arranged independently, and a storage capacitor CS is formed between itself and a gate line of the former stage.

The reflection region A of the reflection electrode 62 is formed in a region just above on a region of any one of a gate line interconnect region made by a metal film, a signal line wiring region, a CS formation region and a TFT formation region or a combination of some.

Figure 18B:
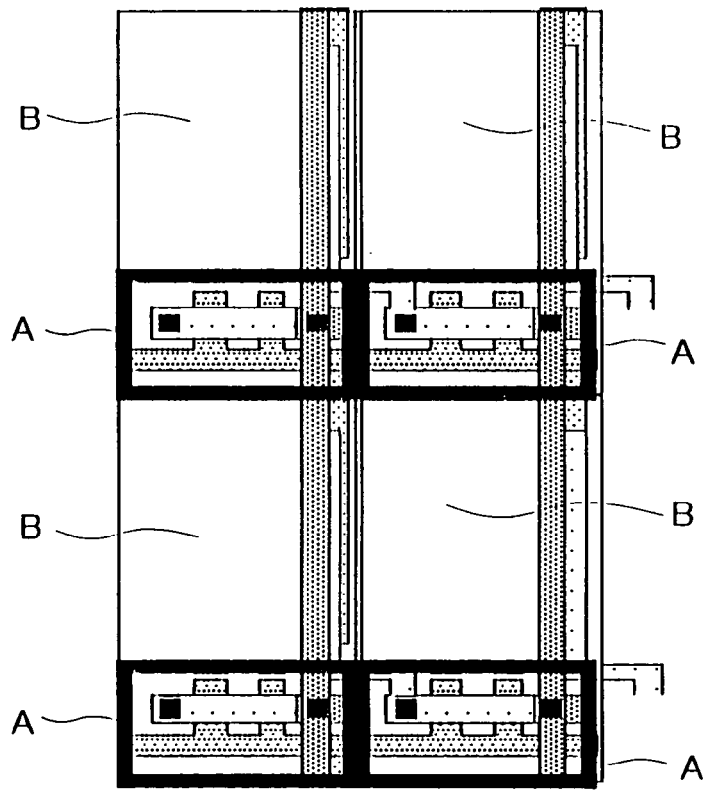
Figure 19A:
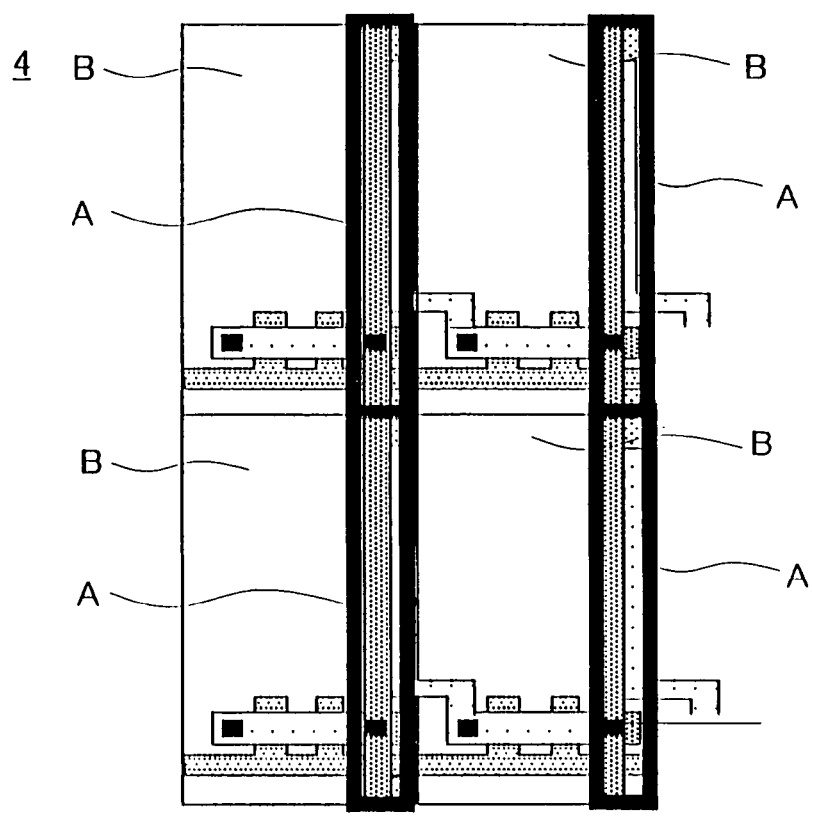
FIGS. 19A and 19B are views of an arrangement position of the reflection region in the respective pixel regions in the liquid crystal display device according to the embodiment of the present invention following FIG. 18B.
Figure 19B:
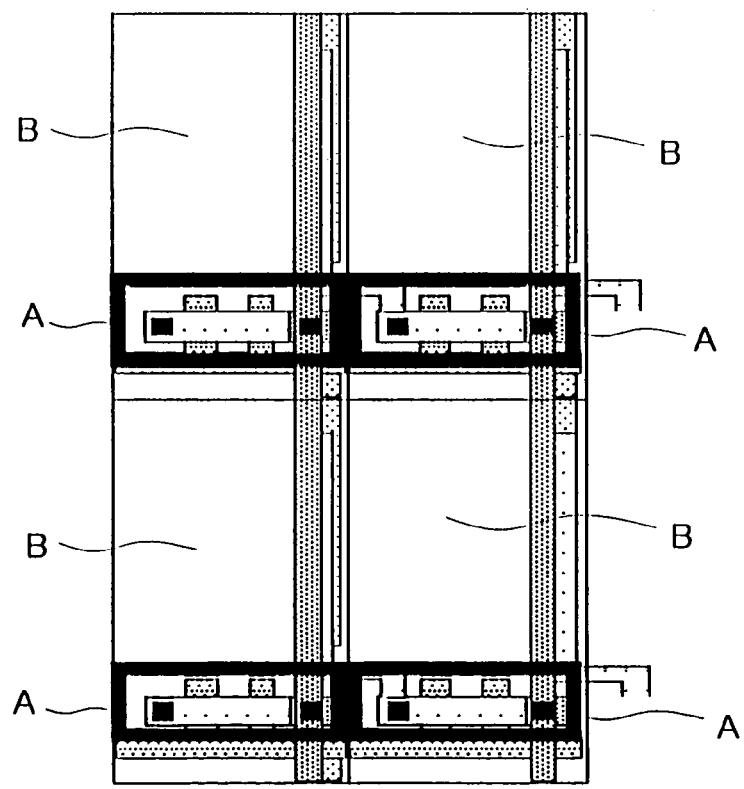
Figure 20:
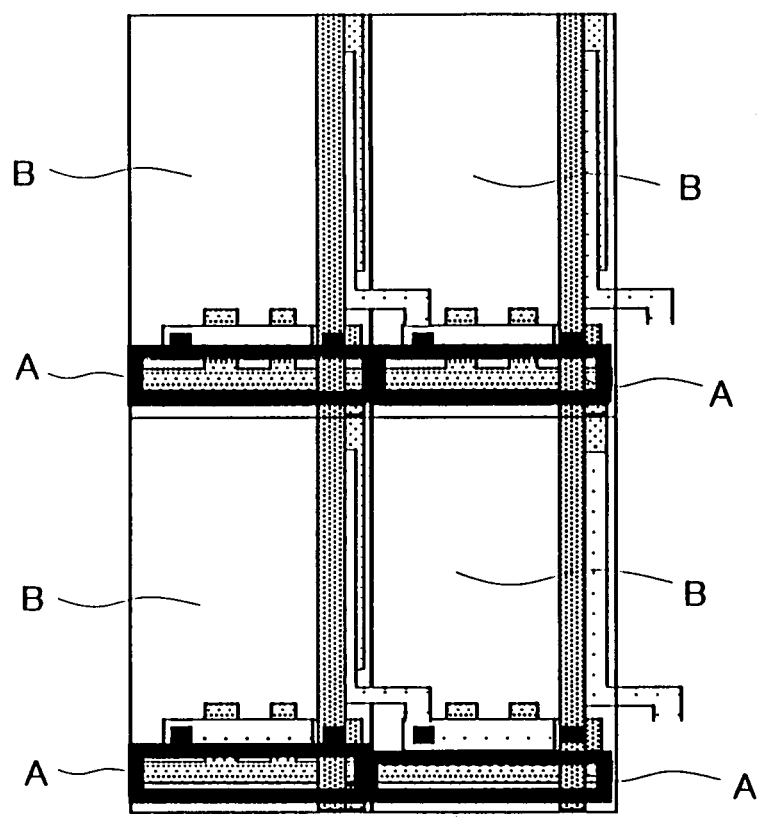
FIG. 20 is a view of an arrangement position of the reflection region of the respective pixel regions in the liquid crystal display device according to the embodiment of the present invention.

FIG. 18B is the case where the gate line interconnect region and the TFT formation region are made to be the reflection region A, FIG. 19A is the case where only the signal line interconnect region is made to be the reflection region A, FIG. 19B is the case where only the TFT formation region is made to be the reflection region A, and FIG. 20 is the case where only the gate liens are made to be the reflection region A.

By efficiently using a space in the pixel in this way, a wide area of the transmission region B can be secured and the transmittance can be improved.

Also in such a liquid crystal display device, the reflection region A is provided just above on a region provided with a metal film, such as metal interconnect, for blocking light from the backlight of the internal light source, specifically on any one of a region arranged with the gate lines 5, a region arranged with the signal lines 6, a region being formed the Cs region 93, and the TFT portion 91 being formed the TFT or a region of combining some of them.

For example, in a pixel region 4 configured as shown in FIG. 18A, the reflection region A is provided just above on the Cs line interconnect region and the gate line interconnect region shown in FIG. 18B. By making the reflection region A by efficiently utilizing a region of blocking the light from the internal light source, the reflection region A and the transmission region B can be efficiently divided in the pixel region 4. As a result, a wide area of the transmission region B can be secured and the configuration stressing on the transmission type can be attained.

An explanation was made based on the preferred embodiment of the present invention above, but the present invention is not limited to the above explained embodiments and may be variously modified within the scope of the present invention.

The configuration of the liquid crystal display device explained in the above embodiments is one example, and the present invention is not limited to the above configuration but may be applied to other configurations.

As explained above, according to the present invention, the transmittance of the display panel of the liquid crystal display device is set to be 4% or more and 10% or less, and the reflectance is set to be between 1% and 30%, and while securing the display light luminance equivalent to that of a display device only with transmission type display and the reflection display light luminance required for display, it becomes possible to deal with highly definition display without increasing the power consumption of the liquid crystal display device.

Also, since low temperature polycrystalline silicon is used, a size of a thin film transistor TFT per pixel can be made small and the whole area of the reflection region and the transmission region is increased. Furthermore, by forming a reflection film made by a metal having a high reflectance or forming a flat reflection film particularly immediately on the interconnect region, an area of the transmission region can be increased and both the reflectance and the transmittance can be improved.

Accordingly, according to the present invention, while maintaining luminance of a display light of the reflection type display at a minimum necessary level, luminance of a display light of the transmission type display can be made to be the equivalent level to that of the transmission type liquid crystal display device, and viewability and color reproducibility can be improved in both of reflection display and transmission display in a liquid crystal display device using both of reflection and transmission.

Industrial Applicability

As explained above, a liquid crystal display device according to the present invention is capable of improving viewability and color reproducibility in both of reflection display and transmission display, so that it can be applied to notebook type personal computers, display device for car navigation, personal digital assistants, mobile phones, digital cameras, video cameras and other electronic apparatuses.

The invention claimed is:

1. A liquid crystal display device comprising a display panel including a plurality of pixel regions arranged in matrix on a substrate, a plurality of transistors formed for each pixel region, a plurality of gate lines for connecting gate electrodes of the plurality of transistors, a plurality of data signal lines for connecting first electrodes of the plurality of transistors, a storage capacitor wherein one electrode is connected to a second electrode of said transistor, a storage capacitor line for connecting the other electrode of said storage capacitor, and a liquid crystal layer arranged between one electrode of said pixel region connected to the second electrode of said transistor and the other electrode opposing to the electrode, wherein:

said storage capacitor is connected to a gate line of the former stage and has the Cs-on-gate structure wherein a storage capacitor is superimposed on the gate line;

a reflection portion and transmission portion are arranged in each of said pixel regions; and a reflectance of light by the reflection portion of a selected pixel is 1% or more and 30% or less of the light incident thereon for defining an entire display signal range from a lowest value to highest value, and a transmittance of light by the transmission portion of a selected pixel is at most 4% or more and 10% or less of the light incident thereon for defining an entire display signal range from a lowest value to highest value;

wherein the liquid crystal display device includes a polarization plate and further wherein a polarity of a counter potential is inverted for every horizontal scanning period, the display having a resolution of at least 200 ppi, and further wherein the reflection portion extends perpendicularly above a CS formation region, and the reflection portion of each pixel is substantially centrally located over at least one conductive member located at a single outer side edge of the transmission portion and extending substantially along an entire length of the outer side edge of the transmission portion such that each of a plurality of adjacent pixels have corresponding reflective portions with common boundary regions, wherein light amount of the display light is 20 cd/m$^2$ or more and 2000 cd/m$^2$ or less under a condition that irradiation of light of a light source is 500 cd/m$^2$ or on said display panel, and said transistor is a thin film transistor having a semiconductor layer of low temperature polycrystalline silicon, an area of each transmission region is 40% or more of said entire pixel region and an area of each reflection region is 1% or more and 60% or less of said entire pixel region, and further wherein an aperture ratio of each transmission region is 40% or more and less than 100% of said entire pixel region in said pixel region.

2. A liquid crystal display device as set forth in claim 1, wherein light amount of the display light is 20 cd/m$^2$ or more and 1000 cd/m$^2$ or less under a condition that irradiation of a light of an ambient light is 2000 lx or more and 50000 lx or less on said display panel.

3. A liquid crystal display device as set forth in claim 1, wherein each reflection region is formed by a metal film having a high reflectance.

4. A liquid crystal display device as set forth in claim 1, wherein each of said reflection regions is formed in a region just above any one of an interconnect region of said gate line, an interconnect region of said data signal line, an interconnect region of said storage capacitor line, and a formation region of said transistor, or a region obtained by combining a plurality of the regions.

5. A liquid crystal display device as set forth in claim 1, comprising a selector switch for performing time-sharing driving on said signal lines.

* * * * *